Apr. 17, 1923.                                          1,452,436
C. G. PULLIN
FRONT FORK FOR VELOCIPEDES
Filed July 20, 1920          2 Sheets-Sheet 1
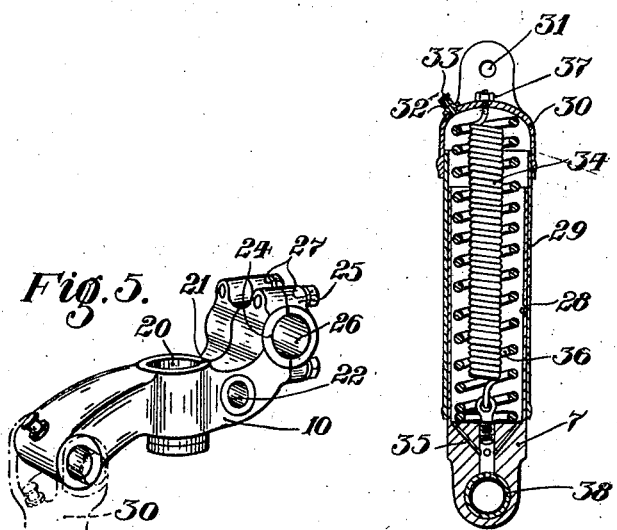
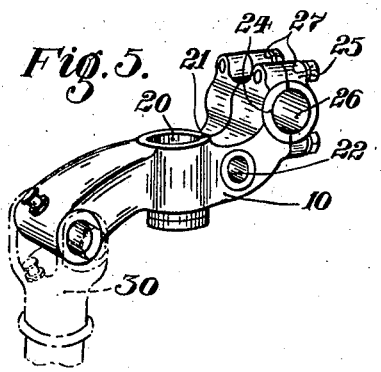
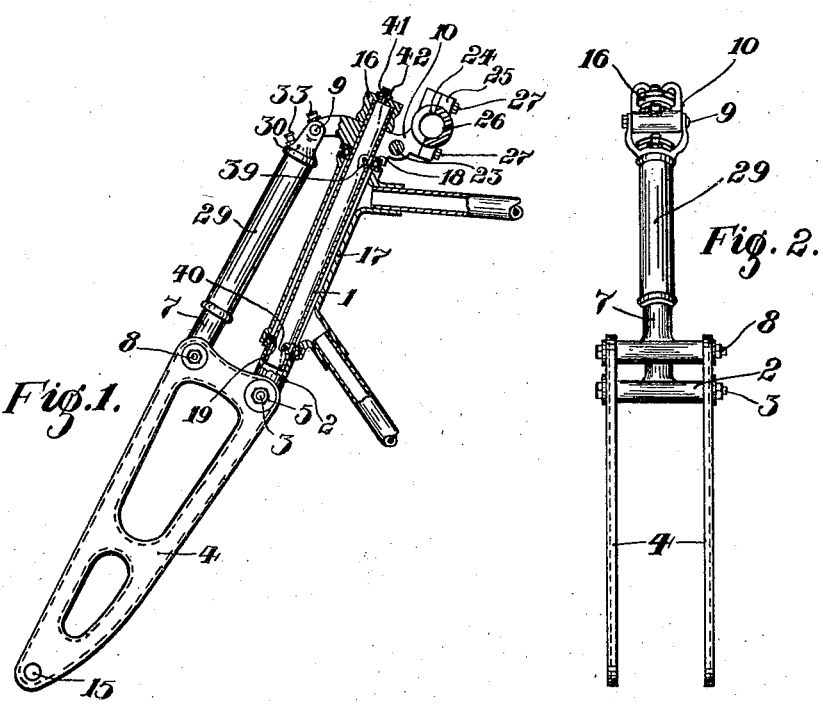
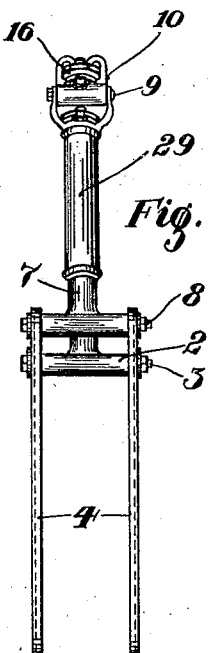
C. G. PULLIN.
Inventor.
per Eugene G. Brown
Attorney.

Apr. 17, 1923.
C. G. PULLIN
1,452,436
FRONT FORK FOR VELOCIPEDES
Filed July 20, 1920
2 Sheets-Sheet 2
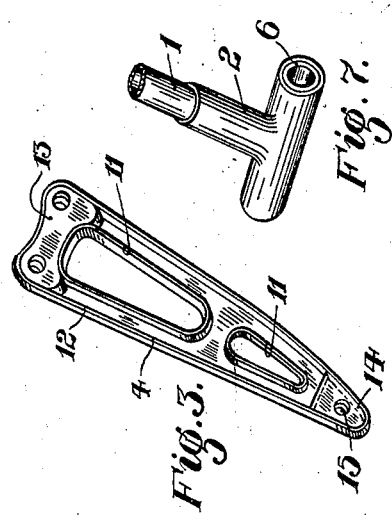
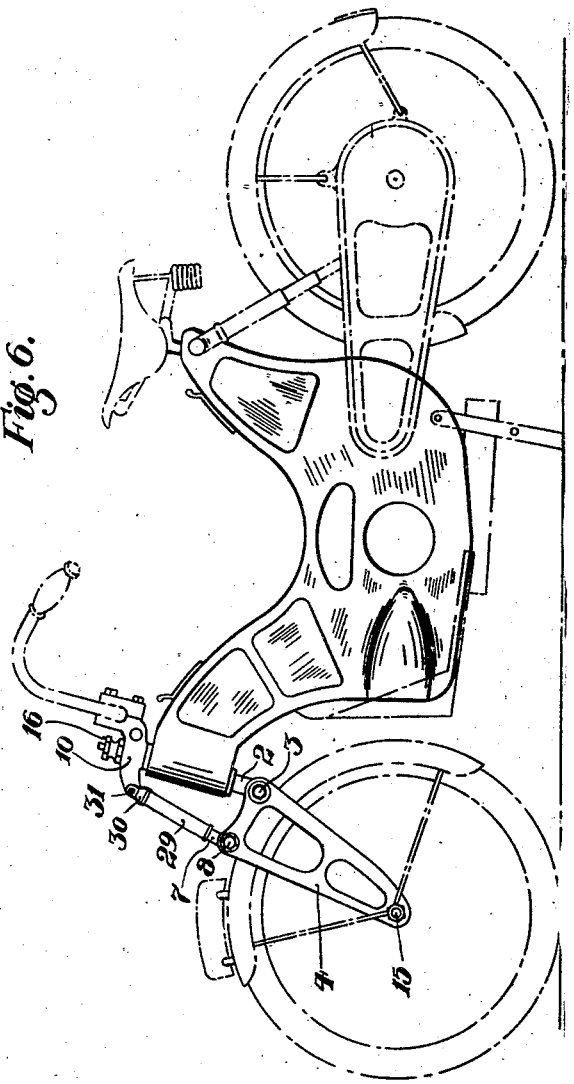
C. G. PULLIN.
Inventor.
per: Eugene C. Brown
Attorney Patented Apr. 17, 1923.

1,452,436

UNITED STATES PATENT OFFICE.

CYRIL GEORGE PULLIN, OF ISLEWORTH, ENGLAND.

FRONT FORK FOR VELOCIPEDES.

Application filed July 20, 1920. Serial No. 397,572.

*To all whom it may concern:*

Be it known that I, CYRIL GEORGE PULLIN, a subject of the King of Great Britain, residing at Isleworth, Middlesex, England, have invented certain new and useful Improvements in or Relating to Front Forks for Velocipedes, of which the following is a specification.

This invention relates to the construction of front forks for velocipedes and has for its object to provide a spring fork construction, efficient in action, and of light weight, easily assembled, and in which the wearing parts are properly lubricated.

According to the present invention the front fork comprises a rigid member adapted to be supported in the front tube of the frame of the machine, a lower fork member with a pair of triangular arms, pivoted at one corner of the triangular base of the said rigid member and a telescopic member interposed between the other base corner of the arms at a point towards the top of the rigid member.

In order that my said invention may be more clearly understood I will now describe the present embodiment with reference to the accompanying drawings, in which:

Figure 1 shows in elevation, partly in section, the combination of a front fork structure constructed according to this invention with an ordinary bicycle frame.

Figure 2 is a front elevation of the construction,

Figure 3 is a view of one of the lower parts of the front fork structure detached, Figure 4 is a central sectional view through the telescopic shock absorber means compressed in the structure and hereafter referred to, Figure 5 is a pictorial view of an attachment adapted to be disposed on the top of the ball head tube of the front fork structure, said attachment being utilized for clamping the handle bar in position.

Figure 6 is a general elevation of a motor driven velocipede having a centre frame of box like structure constructed according to the present invention, while, Figure 7 is a pictorial view, to an enlarged scale of a modified form of the rigid T shaped member.

Broadly speaking a front fork structure constructed according to the present invention comprises a rigid member or steering column, a pair of triangular fork members, a shock absorber and an attachment for clamping the handle bar.

The rigid member or steering column 1 of the front fork structure is formed from a length of steel tubing, to the lower end of which is brazed or otherwise formed or suitably connected a T shaped member or extremity 2, the inner surface of which provides a bearing surface for a pivot pin 3 which is projected therethrough and is hereinafter referred to as the main hinge pin of the triangular arms 4 and which connects one base corner of each of the triangular arms 4 to the said T shaped piece 2, which latter acts as a distance piece therebetween.

The pivot pin 3 is suitably formed at each extremity to receive securing means such as nuts 5 for retaining the triangular arms in connection with the T shaped member.

In some cases the bearing surface formed within the T shaped piece may be provided with a suitable sleeve member as is well known in the art and as indicated at Figure 7, the sleeve being identified by the reference numeral 6.

The other base extremities of the triangular arms 4, that is, the forward base corners, may be similarly formed by a T piece 7 having a solid stem while the base of the T is formed as a tube, which tube is provided with an inner surface adapted as a bearing surface for a forward hinge pin 8 projected therethrough and with co-operating nuts and washers is adapted to secure the triangular arms in position against the respective extremities of this last mentioned tubular T piece. This end bearing surface may be formed, as stated with reference to the T piece of the main hinge pin 8, with a sleeve member.

The stem of the forward T piece 7 is brazed or otherwise fixed to a telescopic shock absorber, hereinafter more fully described with reference to Figure 4, the other end of the shock absorber being pivotally connected at 9 to an attachment or bracket 10 secured to the top of the rigid member 1, which attachment is adjusted to receive and clamp securely thereto the handle bar of a velocipede. The attachment 10 will be more fully described with reference to Figure 5 hereafter.

The triangular arms 4 of the front fork structure are similarly shaped one to the other, by pressing out of rolled sheet metal, and as will be seen in Figure 3 the prefererd construction comprises lightening holes, the borders of which are flanged, as at 11, during the pressing operation, further the peripheries of the fork members are also formed with a similar flange as indicated at 12.

The base portion and the apex portion of each member is also preferably reinforced as at 13 and 14 respectively (Figure 3) so that additional strength is obtained for the bearings of the front and main hinge pins and also for the spindle of the front wheel which is supported at the apex of the said members, the position of the bearings for said spindle being indicated by the numeral 15.

The reinforcement plates may be made removable or rendered integral with their respective triangular arms by spot welding or other suitable means.

In the construction according to this invention the rigid member, which takes the place of the usual ball head tube, is longer than the ball head tube in order to project well above the top bearing in the frame of the velocipede and on this projecting portion is mounted the attachment 10 which is screwed thereon by means of nut members 16 engaging with a threaded extremity formed at the co-operating end of the rigid column 1.

Referring to Figure 1 the frame of the velocipede is indicated by the numeral 17 and the upper and lower bearings for the rigid member 1 are identified by the reference numerals 18 and 19.

It will be seen that by screwing down the nut member 16 on the co-operating extremity of the rigid member 1 that the said rigid member is secured in position in the ball head tube of the frame and in proper relation to the bearings 18 and 19, while the attachment 10 is brought up against the upper bearing 18.

The bottom of the ball head tube and the meeting edges thereof and the bottom of the attachment 10 are so formed as to enclose the respective bearings 19 and 18.

The attachment 10 is centrally bored at 20 to provide a sliding fit on the rigid column 1 and is split to the rear of the central bore 20, as shown at 21, and further is provided with a transverse hole 22 through each of the portions separated by the split so that after the attachment 10 is disposed on the rigid member 1 a tightening arrangement, such as a bolt and nut 23 may operate to close up the split 21 and effect a vice like grip on the rigid member 1.

The rear of the attachment 10 is formed with a plane face and a semi-circular recess 24 and complementary surface members 25 are formed with semi-circular recesses as shown at 26.

The handle bar may be clamped in the recess 24 and held against the same, by a juxtaposed surface members 25 which are ultimately secured to the attachment 10 by suitable means such as fixing screws 27.

Referring now to Figure 4 the shock absorber is comprised by two hollow cylinders 28 and 29, one 28 adapted to slide within the other 29. The cylindrical member 28 is suitably connected, for instance, by welding with the forward T piece 7, while the other cylindrical member 29 is formed with a yoke piece 30 provided with bearings 31 for attachment by means of the pivot pin 9 to the attachment 10, as fully illustrated at Figure 5.

The yoke member 30 forms a closure at the adjacent extremity for the hollow cylinder 29 and through the closure is provided a small boring 32, with any suitable cap 33, for use as a means of supplying lubricant to the interior of the shock absorber.

The closed end of the cylindrical member 29 forms one anchorage for the tension spring 34, the other end of which is secured to the stem of the forward T piece 7, which stem forms a closure to that end of the hollow cylinder 28.

Further the stem is provided with conducting passages such as 35 whereby lubricant passing through the shock absorber may be directed to the bearing 28 for the forward hinge pin 8. Disposed between the closed ends of the cylinder and tending to separate them is a compression spring 36. In Figure 4 the bearing 38 is shown as comprised by a sleeve member projected into the tubular bar portion of the forward T piece 7 having an equivalent construction to that shown in Figure 7 for the tubular T piece connecting the rear base corners of the triangular arms 4.

It is generally required that the effect of the tension and compression springs produces an equilibrium in the shock absorber; therefore to provide the necessary adjustment of one spring I have provided at the anchorage, at the closed end of the cylinder 29, for the tension spring 34 a nut and washer for engagement with a threaded extremity of the tension spring 34, this adjusting device is indicated at 37.

In the application of this invention to motor driven velocipedes having a central frame of box-like structure I prefer to lubricate the bearings for the steering column or rigid member 1 by providing the construction now to be described.

Adjacent each of the bearings 18 and 19 I provide lugs 39 and 40 projecting inwardly of the rigid member 1. These lugs are formed by cutting a portion of the body of the rigid member 1 and pressing in that portion bounded by the cut so that at the back of each lug so formed and therefore adjacent each of said bearings an aperture is formed in the body of the rigid member.

Further the nut member 16 is provided with an aperture 41 for the projection into the rigid member 1 of a suitable lubricant and the aperture is provided with any suitable dust cap such as 42.

Now, if the lubricant be projected within the aperture 41 it will impact against the wall of the rigid member 1 whilst on travelling down will be obstructed in its path by the lug 39 which will direct a portion of the lubricant through the aperture behind it and into the adjacent bearing 18 and when this bearing is flooded the whole stream of lubricant will pass on until it is again obstructed by the lower lug 40 which in a similar manner will direct a portion of the lubricant through the adjacent aperture and into the bearing 19.

Neither of the lugs are intended to entirely obstruct the stream but merely to direct a portion.

The lubricant passing both bearings will then travel into the stem of the tubular T piece 2 through which it is permitted to travel in order to provide the required lubricant for the main hinge pin 3.

By such construction a proper supply of lubricant is obtained where it is required and the access of dust or grit is substantially prevented. I have found that the construction of the front fork element herein described together form a structure of great strengh and further is cheaply and easily manufactured.

In operation I have found that by the particular position of the hinge pin centres a relatively large amount of movement of the wheel about the main hinge pin causes but very little deflection of the telescopic shock absorber so that wear of the working parts is minimized and a steady springy action is obtained.

By the use of the tension adjusting device in the shock absorber chattering is damped out and vibration due to periodicity is eliminated while the combination of the tension and compression springs provide the required flexible tie between the upper and lower portions of the shock absorber.

I claim:

In combination on a velocipede, a ball head tube having a tubular T-shaped lower extremity, a transverse main hinge pin carried by said T piece, a pair of sheet metal triangular members, forming the arms of the front fork of the velocipede, mounted on said main hinge pin at the rear corners of their bases, and separated by said tubular T piece, means retaining said triangular members on said hinge pin, and against said tubular member, means connecting the apex of each triangular member to the respective end of the spindle of the front road wheel of the velocipede, and shock absorber means connecting the forward base corner of each triangular member to a point adjacent the top of said ball head tube, said shock absorber having a lower T shaped extremity carrying a bearing for a forward hinge pin projected through the forward base corners of said triangular member and the said T shaped extremity and having a lubricant conduit, leading from the interior of said shock absorber to said forward hinge pin.

In testimony whereof I affix my signature.

CYRIL GEORGE PULLIN.